July 7, 1959  B. P. CLARKE  2,893,357
CONTROLLING DEVICE FOR HOISTS
Filed March 19, 1954  5 Sheets-Sheet 1

INVENTOR
BRUCE P. CLARKE
BY
HIS ATTORNEY

INVENTOR
BRUCE P. CLARKE
BY
HIS ATTORNEY

INVENTOR
BRUCE P. CLARKE
BY
HIS ATTORNEY

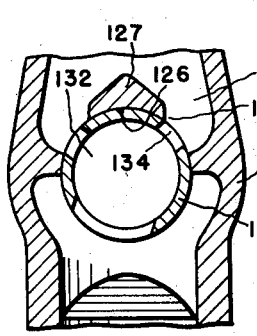 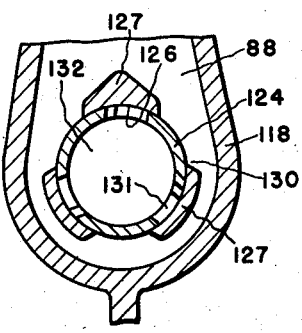 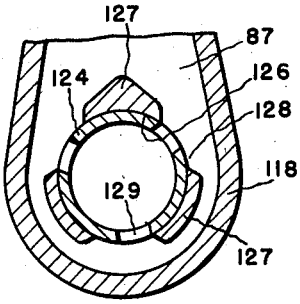
FIG. 14   FIG. 15   FIG. 16
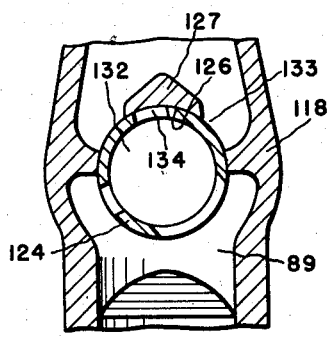 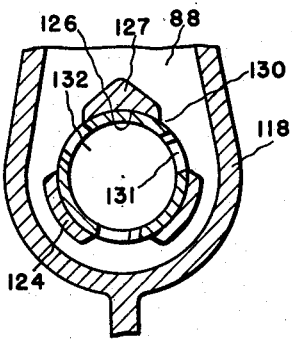 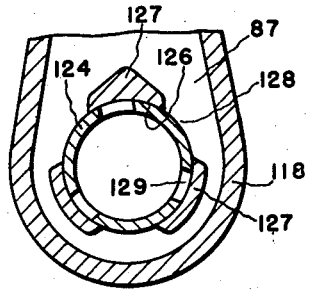
FIG. 17   FIG. 18   FIG. 19
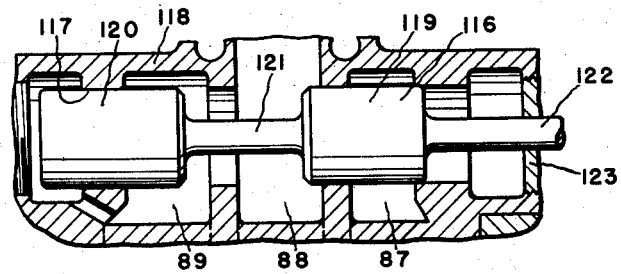
FIG. 20
FIG. 21
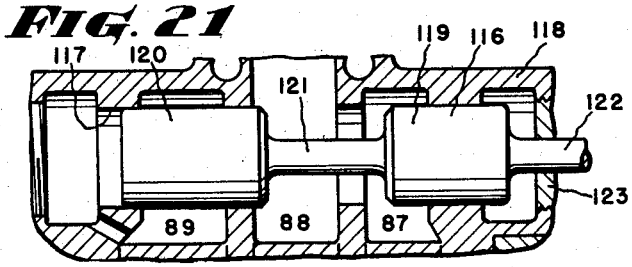
INVENTOR
BRUCE P. CLARKE
BY
HIS ATTORNEY July 7, 1959     B. P. CLARKE     2,893,357
CONTROLLING DEVICE FOR HOISTS
Filed March 19, 1954     5 Sheets-Sheet 5
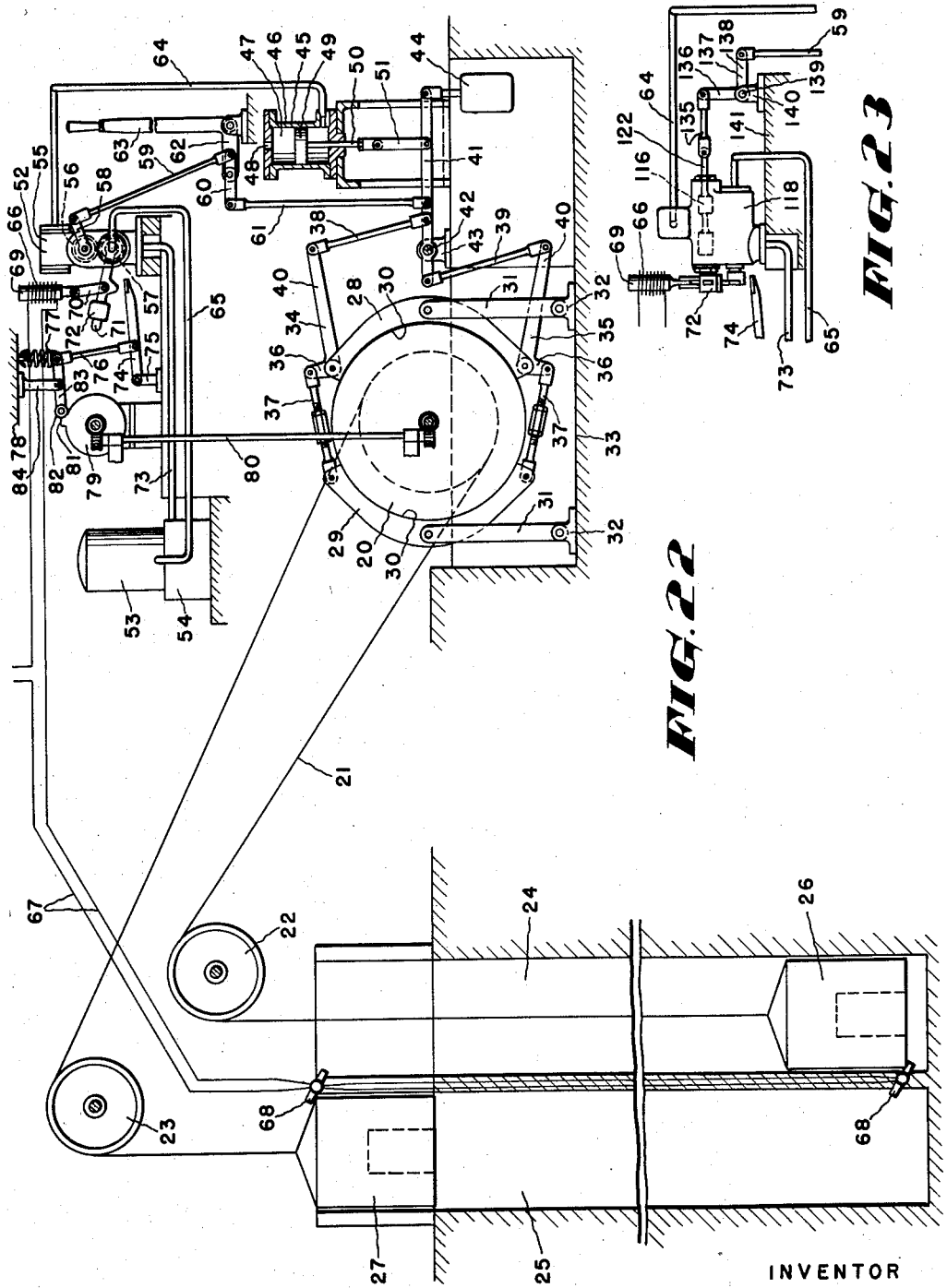
INVENTOR
BRUCE P. CLARKE
BY
HIS ATTORNEY

United States Patent Office 2,893,357
Patented July 7, 1959

2,893,357

CONTROLLING DEVICE FOR HOISTS

Bruce P. Clarke, Lennoxville, Quebec, Canada, assignor to Ingersoll-Rand Company, New York, N.Y., a corporation of New Jersey Application March 19, 1954, Serial No. 417,365

6 Claims. (Cl. 121—46.4)

This invention relates to hoisting mechanisms, and more particularly to a controlling device for hoists having hydraulically actuated brakes for the hoist drum.

One object of the invention is to render the braking mechanism of the hoist sensitively responsive to the controlling actions of the operator.

Another object is to obviate the chances of the cage, or cages, lifted by the hoist from over-running certain predetermined limiting points in their ranges of travel.

Still another object is to assure the positive application of drum engaging movement to the hoist brakes in the event that the cages over-run the safe limiting points in their ranges of movement.

And a further object is to enable the hoist braking mechanism to be manipulated suchwise that the hoist drum may be stopped without imparting jars or strains to the hoisting mechanism, the cages and the cable carrying the cages.

Other objects will be in part obvious and in part pointed out hereinafter.

Figure 2:
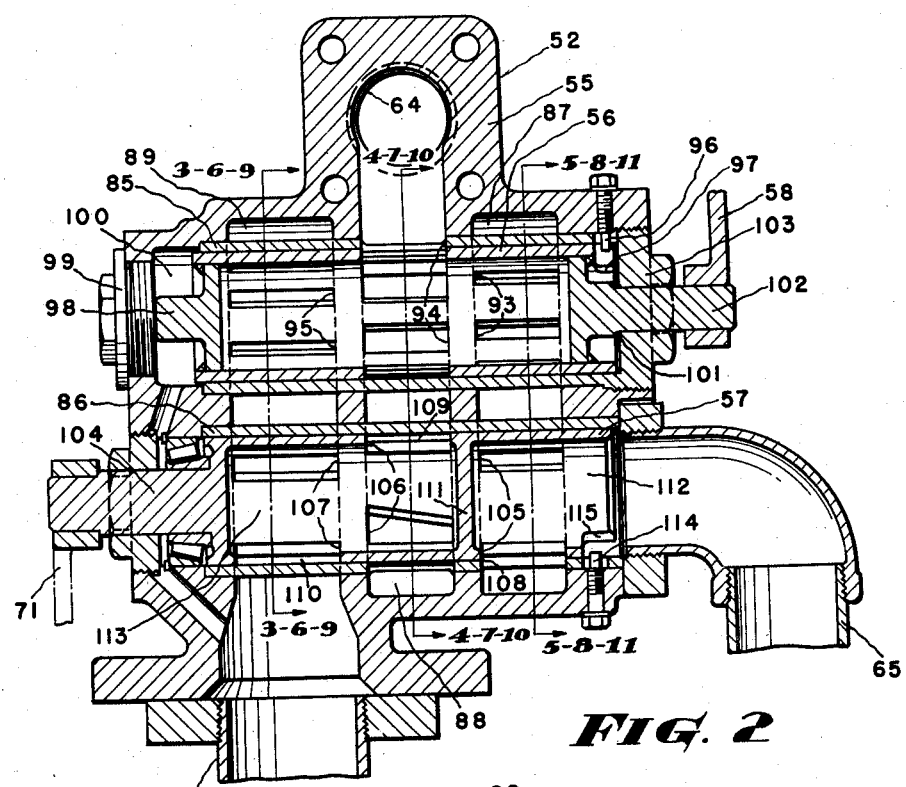
Figure 1:
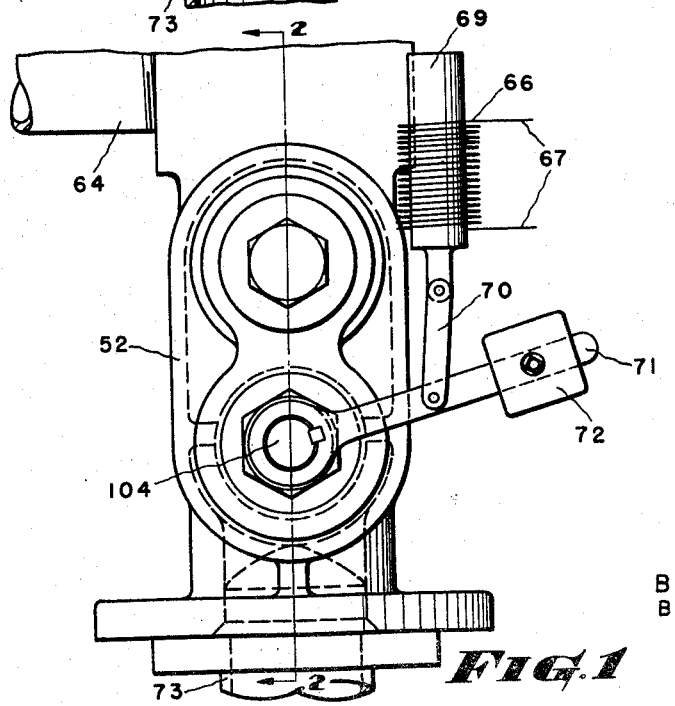
Figure 3:
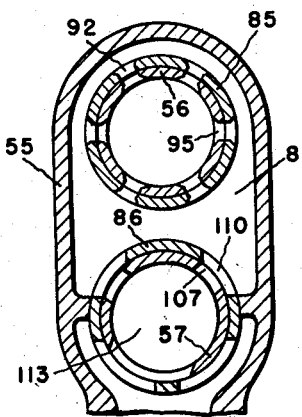
Figure 4:
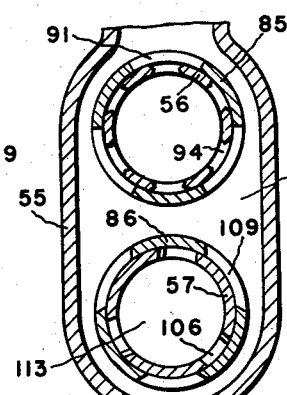
Figure 5:
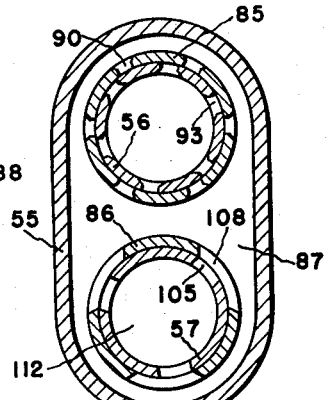
Figure 6:
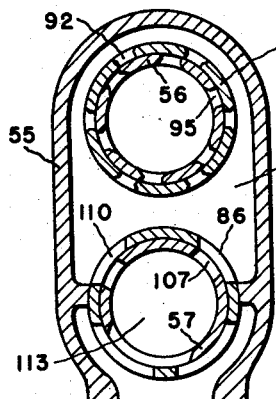
Figure 10:
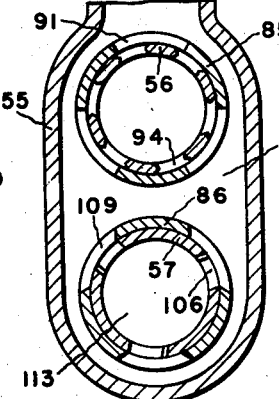
Figure 11:
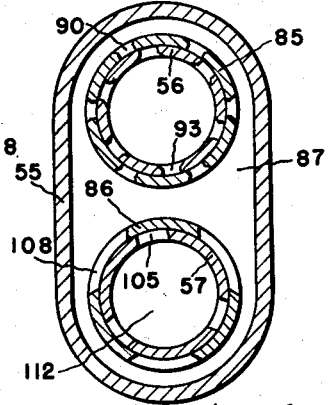
Figure 13:
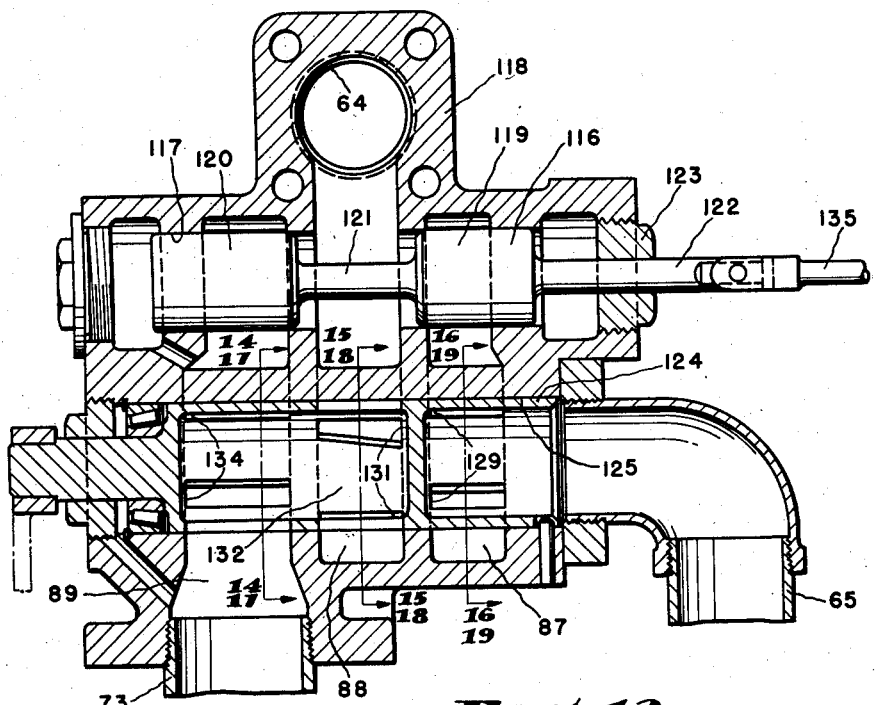
Figure 12:
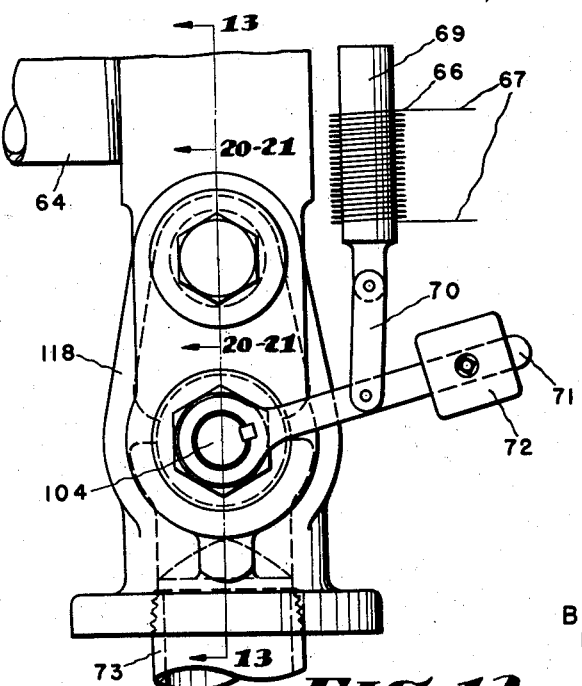

In the drawings accompanying this specification and in which similar reference numerals refer to similar parts, Figure 1 is an end elevation of a valve mechanism for controlling the flow of power medium to and from the braking engine of the hoisting mechanism, Fig. 2 is a transverse view, in elevation, taken through Figure 1 on the line 2—2, Figs. 3 to 11 inclusive are transverse views taken through Fig. 2 on the lines 3—3 to 11—11 inclusive showing the ports and passages of the valve mechanism and the manner in which the valve elements thereof cooperate with each other to control the power supply to the hoist braking engine, Fig. 12 is a view similar to Figure 1 showing a modified form of valve mechanism for controlling the power medium to the hoist braking mechanism, Fig. 13 is a transverse view taken through Fig. 12 on the line 13—13, Figs. 14 to 19 inclusive are transverse views taken through Fig. 13 on the lines 14—14 to 19—19 inclusive, Figs. 20 and 21 are transverse views taken through Fig. 12 on the lines 20—20 and 21—21 showing one of the valve elements of the valve mechanism in different controlling positions, Fig. 22 is a diagrammatic view, in elevation, of a hoisting mechanism equipped with a valve mechanism of the form shown in Figs. 1 and 2, and Fig. 23 is a fragmentary view, in elevation, illustrating the embodiment, in the hoisting mechanism, of a valve mechanism of the form shown in Figs. 12 and 13 and linkage suitable for operating one of the valve elements.

Referring to the drawings and at first more particularly to Fig. 22, 20 designates a hoist drum which may be rotated by any suitable prime mover, as for example an electric motor (not shown), and 21 is a cable wound around the drum 20 and trained over sheaves 22 and 23 positioned above the entrances of shafts 24 and 25 which contain cages 26 and 27, respectively, that are supported by the cable 21.

The drum 20 is provided with braking means comprising a pair of shoes 28—29 having braking surfaces 30 for frictional engagement with the surface of the drum. The brake shoes are disposed on opposite sides of the drum and rock upon links 31 which are supported by bearings 32 seated upon the foundation 33 for the hoisting mechanism.

Braking movement is transmitted from one shoe to the other by linkage comprising bell cranks 34 and 35 which are pivotally connected at the apices of their angles to the upper and lower ends of the shoe 28 and have arms 36 pivotally connected to turnbuckles 37 attached to the brake shoe 29. Brake controlling movement is transmitted to the bell cranks 34—35 by links 38 and 39 connected pivotally to the free ends of the arms 40 of the bell cranks and to a rocker arm 41 mounted upon a pivot 42 supported by a bearing 43. The links 38 and 39 are connected to the rocker arm on opposite sides of the pin 42, and on the free end of the arm 41 is a weight 44 which tends constantly to impart braking force, by gravity, to the shoes 28 and 29 through the associated linkage.

Brake-releasing movement of the shoes 28—29 is effected by an engine 45 comprising a cylinder 46 having a piston chamber 47 the upper end of which is open to the atmosphere through a port 48. The piston chamber 47 contains a piston 49 having a rod 50 that extends through the lower end of the cylinder 46 and carries a link 51 which is connected to the rocker arm 41 for transmitting movement from the piston to the braking mechanism.

The motive fluid for operating the engine 45 is controlled by a valve mechanism 52 and is derived from an accumulator 53, of a well known type, including in its organization a pumping device (not shown) but which may be supported by a casing 54 the interior of which constitutes a supply reservoir for the accumulator. The valve mechanism 52, which will be described in detail hereinafter, is illustrated as being of the form of the invention shown in Figs. 1 and 2 and comprises a casing 55 containing a pair of valves 56 and 57 which serve, respectively, as control and emergency valves.

Both valves are rotatable within the casing 55 and only the valve 56 is controlled by the hoist operator. It accordingly has a lever 58 pivotally connected to a rod 59 that is connected to an end of a rocker 60, the other end of which is connected to a rod 61 depending therefrom and connected to the rocker arm 41 at a point adjacent the link 38 and between said link and the link 51. The rocker 60 is connected pivotally, intermediate its ends, to an arm 62 of a lever 63 of bell crank shape whereby the hoist operator controls the movement of the valve 56.

The rocker 60 is, in effect, a compensating member and in that capacity serves to move the valve 56 to position for cutting-off the flow of motive fluid to the braking engine after each movement of the lever 63. Such movement is imparted to the rocker, and thus to the valve, by the piston and the associated linkage so that, in consequence, the distance travelled by the brake engine piston 49 will be proportional to the length of the arc through which the hand lever is rocked. The fluid controlled by the valve 56 flows to and from the piston chamber 47 through a conduit 64 leading from the valve casing 55 to the lower end of the piston chamber 47 and is conveyed from the accumulator to the valve mechanism 52 by a conduit 65 and flows, during normal operation of the hoisting mechanism, through the valve 57 to the valve 56.

The valve 57 is intended to operate only in the event of an emergency as, for example, when the cages 26—27 over-run the terminal points of their normal ranges of movement. The valve 57 is, accordingly, normally held in a position to permit the free flow of motive fluid to and from the valve 56 by a solenoid 66 the circuit 67 of which extends along the shafts 24—25 and is provided, at the extremities of the shafts, with trip switches 68 that are opened when contacted by a cage and will act automatically to close the circuit when out of engagement with the cage.

The armature 69 of the solenoid 66 is connected, as by a link 70, to an arm 71 which is affixed to the valve 57 and carries a weight 72 to rotate the valve 57 by force of gravity whenever the solenoid 66 is demagnitized. In the position which the valve 57 will then occupy motive fluid will flow from the brake engine 45 and return to the supply reservoir 54 through a conduit 73, this being also the course for the fluid flowing back from the braking engine through the valve 56 during the normal operation of the hoisting mechanism.

Means are provided to assure the establishment of only restricted flow areas between certain of the passages which the valve 57 controls following the demagnetization of the solenoid 66. To this end a lever 74, pivoted at one end on a post 75, is disposed beneath the arm 71 to arrest the downwind movement of and hold said arm in a position corresponding to only a partly open position of the valve 57. The lever 74 is held thus, yieldingly, by a link 76 depending from a tension spring 77 that is anchored to an overhead support 78.

The lever 74 is, however, capable of further downward movement to permit of the full range of movement of the valve 57 and the means whereby such movement is effected comprises a cam 79 of a well known controlling device which is rotated by a shaft 80 geared to the cam and to the shaft of the drum 20. The cam 79 has on its periphery a cam surface 81 for lifting a cam follower 82 on an end of a rocker 83 which is pivoted intermediate its ends on a bracket 84 depending from the support 78 and having its other end pivotally connected to the link 76.

The valve mechanism 52 to which reference has been made only briefly hereinbefore, to explain its relationship and function in the hoisting mechanism, comprises, in addition to the parts previously mentioned, bushings 85 and 86 inserted in the upper and lower portions of the valve casing 55 to accommodate the valves 56 and 57, respectively. The casing 55 is recessed to provide chambers or passages 87, 88 and 89 through which the bushings extend and which serve in that order as supply, inlet and discharge chambers.

The bushings 85 and 86 extend through all of the chambers, and in the bushing 85 are groups of ports 90, 91 and 92 for communication with the chambers 87, 88 and 89, respectively. The ports in the bushing 85 are controlled by the valve 56 which has groups of radially extending ports 93, 94 and 95 to register, respectively, with the ports 90, 91 and 92.

The valve 56, as has been previously explained, is rotatable within the bushing 85 and the extent of such movement is limited by a stop member 96 which is threaded into the casing 55 and extends into a slot 97 in the valve 56 for engagement with the ends of said slot. A projection 98 at one end of the valve engages a closure 99 for the bore 100 containing the bushing 85 to prevent endwise movement of the valve in one direction, and such movement of the valve in the opposite direction is prevented by a shoulder 101, on a stem 102 carrying the lever 58, engaging a closure 103 for the adjacent end of the bore 100.

The valve 57 also carries a stem, designated 104, for connection with the arm 71 and has groups of ports 105, 106 and 107 that register, respectively, with ports 108, 109 and 110 in the bushing 86 and opening, in that order, into the supply, inlet and discharge passages 87, 88 and 89. An internal wall 111 located between the groups of ports 105 and 106 divides the interior of the valve 57 into chambers or passages 112 and 113 for communication, respectively, with the supply conduit 65 and the inlet and discharge passages 88—89. The degree of rotary movement of the valve 57 is limited by a stop member 114 and the ends of an arcuate slot 115 in the valve into which the stop member extends.

Figure 8:
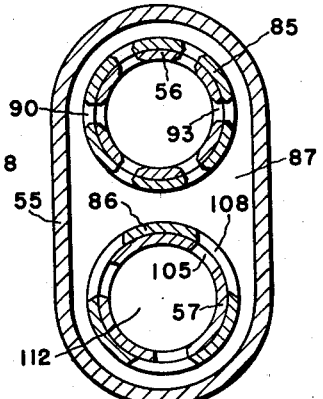

In the operation of the device, and assuming that it be intended to release the brake shoes 28—29 from the drum 20, the lever 63 is tilted rightward, as Fig. 22 is viewed in the drawings, and the resulting upward movement of the arm 62 will tilt the rocker 60 about its pivot, thereby thrusting the rod 59 upwardly and rotating the valve 52 to bring the ports 93 into registry with the ports 90 in the bushing 85. In this connection it should be stated that, during the normal operation of the hoist, the solenoid 66 is magnetized and holds the valve 57 in position to place the ports 105 in registry with the ports 108, as illustrated in Fig. 8 of the drawings, so that motive fluid will flow directly from supply through the chamber 112 of the valve 57 into the supply chamber and to the valve 56.

Figure 7:
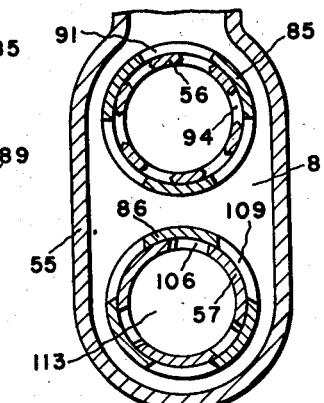

In these position of the parts, the ports 106 in the valve 57 will be blanked off by the bushing 86, as shown in Fig. 7, so that no fluid may flow from the inlet chamber through the valve 57 to the discharge chamber 89. The ports 95 of the valve 56 will then also be blanked off by the bushing 85, see Fig. 6, and the ports 94 will be in registry with the ports 91, as shown in Fig. 7, so that motive fluid will flow through the conduit 64 into the piston chamber 47 to raise the piston 49, say, to the position shown in Fig. 22, and thereby release the brake shoes from the drum.

During such upward movement of the piston 49 the linkage connecting it with the rocker 60 will tilt said rocker and cause the rod 59 to be drawn downwardly and the valve 56 to be rotated in a direction for cutting-off the flow of motive fluid to the braking engine. The speed at which the valve 56 will be rotated in this direction will be governed by the rate of movement of the piston 49 and of the rocker arm 41 the movement of which is transmitted to the valve 56 through the rods 61 and 59 and the rocker 60. Thus the lever 63, in any of its controlling positions, predetermines the position to which the engine piston 49 will move in the piston chamber 47, as well as the time required for the piston to reach such position and the time required for the valve 56 to arrive in position to cut-off the flow of motive fluid to the braking engine.

Conincident with the releasing of the drum by the braking apparatus, the motor driving the drum 20 will be set in operation, in a manner well understood, for moving the cages 26—27, and when the cages approach the ends of the shafts 24—25 the leve 63 is rocked leftward. The rocker 60 will thereby be caused to tilt about its pivot on the arm 62 and, through the rod 59, to shift the valve 56 to the position shown in Figs. 5, 4 and 3 of the drawings. The ports 93 of the valve will then be blanked off to cut-off communication between motive fluid supply and the braking engine and the ports 94—95 will be uncovered. Fluid will then be expelled from the piston chamber 47, by the weighted piston, through the valve 56 to the discharge chamber 89, thence through the portion 113 of the valve 57 and the conduit 73 back to the supply reservoir of the accumulator 53.

Figure 9:
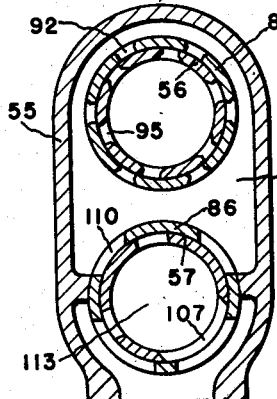

The descending movement of the piston 49, the rocker arm 41 and the rod 61 will tilt the rocker 60 and thrust the rod 59 upwardly, thereby rotating the valve 56 to a position wherein the ports 93 and 95 are blanked off and the ports 94 are uncovered, as shown in Figs. 11, 9 and 10, respectively.

The foregoing described mode of operation of the hoisting mechanism is that which normally takes place for moving the cages 26—27, and during each period of rotation of the hoist drum the cam 79 is rotated to carry the cam surface 81 either away from the follower 82 or to return it to a position immediately adjacent the cam follower, depending upon the direction of rotation of the drum 20.

In the event that the cages pass the terminal points of their normal ranges of travel they will trip a switch 68 and open the circuit 67. The solenoid 66 will thereby be demagnetized and the arm 71 will drop down upon the lever 74. This movement of the arm and the consequent rotative movement of the valve 57 will cause the ports 105 to be blanked off to prevent the further flow of motive fluid to the supply chamber, and the ports 106 will then be partly uncovered to permit a restricted flow of fluid from the inlet chamber 88 into the chamber 113, whence it will flow through the ports 107 and 110 into the discharge chamber 89 and return to the reservoir of the accumulator 53. The piston 49 will thereafter descend at the rate permitted by the fluid flowing from the piston chamber 47 and the brake shoes will be gradually applied to the drum by the weight 44 through the associated linkage.

If, however, the braking pressure thus applied is insufficient to stop the drum the cam surface 81 will move under the follower 82 and tilt the rocker 83, thereby depressing the lever 74. The weighted arm 71 will then fall and rotate the valve 57 to a position in which the ports 106 and 107 are fully uncovered. The fluid will then flow freely from the braking cylinder and the full force of the weight 44 will become immediately effective for stopping the drum.

The valve mechanism shown in Figs. 12 to 21 inclusive differs from that previously described mainly in that the valve which controls the supply of motive fluid to the braking engine under normal operating conditions and which is designated 116 is of the spool type reciprocable within a chamber 117 in a valve casing 118. The valve 116 has a pair of heads 119 and 120 which are held in spaced relation to each other by a stem 121, and on the outer end of the head 119 is a rod 122 that projects from the casing 118 and is slidable in a closure 123 for the adjacent end of the valve chamber 117.

The head 119 controls communication between the supply and inlet chambers 87 and 88, respectively, and the head 120 performs a similar function between the chambers 88 and 89. Thus, when the valve is drawn rightward, to the position shown in Fig. 21, the chamber 87 will be uncovered by the head 119 and motive fluid may flow from said chamber into the chamber 88. In this position of the valve the head 120 will then preclude communication between the chambers 88 and 89, and in the opposite hand position of the valve, as shown in Fig. 20, the head 119 will cut-off communication between the chambers 87 and 88 and communication will be established between the chambers 88 and 89.

The emergency valve 124 of this form of the invention is identical with that previously described but the chamber 125 containing it is formed directly in the valve casing 118, instead of being defined by a bushing as in the previously described form of valve mechanism. The bearing surfaces 126 of the chamber 125 upon which the valve 124 rotates are formed on ribs 127 which may extend longitudinally of the valve chamber 125. The ribs 127 are suitably spaced with respect to each other and the spaces between them, see Fig. 16 of the drawing, constitute passages 128 to register with ports 129 in the valve 124 for admitting motive fluid from the source of supply to the chamber 87.

Similarly, in Fig. 15, the spaces between the ribs 127 constitute ports 130 for registration with ports 131 in the valve to communicate the inlet chamber with the interior portion or chamber 132 of the valve, and the spaces between the ribs 127 of Fig. 14 serve as ports 133 to register with ports 134 in said valve for communicating the chamber 132 with the discharge chamber 89.

The mode of operation of the emergency valve 124 and the circumstances under which it is brought into operation are the same as in the form of the valve mechanism shown in Figs. 1 and 2. The position which it occupies during the normal operation of the hoisting mechanism is shown in Figs. 14 to 16 inclusive, and the position which it assumes when released by the solenoid 66 is illustrated in Figs. 17, 18 and 19. The control valve 116, however, being reciprocable is provided with means adapted to impart such movement to it from the control lever 63. The rod 122 accordingly has connected thereto a link 135 which is pivotally connected at one end to the rod 122 and at its other end to an arm 136 of a bell crank 137 the other arm 138 of which is pivotally connected to the rod 59. The bell crank is pivoted at the juncture of the arms 136—138 on a pin 139 in a bearing 140 which is seated upon the foundation 141 which supports the valve casing 118.

In the operation of this form of the valve mechanism, movement of the operating lever 63, to either the brake applying or brake releasing position, will cause the simultaneous operation of the valve 116 to valve motive fluid to the braking engine or to drain fluid therefrom, depending upon whether it be intended to free the hoist drum 20 for rotation or to stop it. Following each movement of the operating lever, and the consequent shifting of the piston 49 of the brake engine and the associated linkage, the valve 116 will be again shifted to a neutral position for cutting-off the supply of motive fluid to the braking engine and for cutting-off the discharge of fluid therefrom. Thus, in all positions to which the lever 63 may be moved the extent of movement of the piston 49 is proportional to the degree of movement of the operating lever. In consequence, the stopping positions of the cages at the terminal portions of the shafts 24—25 may be nicely predetermined and the drum 20 will come smoothly to rest without imparting jars or shocks to the cables or to the cages and their contents.

I claim:

1. A pressure fluid controlling device for hoists comprising a valve casing having a pair of valve chambers and supply, inlet and discharge passages opening into said chambers, a valve in one of said chambers operable into one limiting position to communicate the supply passage with the inlet passage and cut off communication between the inlet passage and the discharge passage and movable into another limiting position to establish communication of the discharge passage with the inlet passage and cut off flow through the supply passage and movable into an intermediate position to cut off all communication between said passages, a valve in the other of said chambers normally positioned to permit such control by the first said valve and operable into another position to cut off flow through the supply passage and to establish communication between the inlet and discharge passages independently of the position of the first said valve, the first said valve being operable to communicate the inlet and discharge passages independently of the position of the second said valve.

2. The pressure fluid controlling device of claim 1 in which at least one of said valves is rotatable into said valve positions.

3. The pressure fluid controlling device of claim 1 in which the second said valve is rotatable into said positions and includes ports in communication with said passages.

4. The pressure fluid controlling device of claim 3 in which said valve is in the form of a sleeve rotatably mounted in a bushing, said bushing having ports in communication with said passages and said sleeve having ports movable into registry with the ports in the sleeve.

5. The pressure fluid controlling device of claim 4 in which the sleeve ports and bushing ports associated with the inlet passage are elongated in shape and inclined relative to each other such that several degrees of rotation of the sleeve is required to provide complete registry between the sleeve and bushing ports.

6. A pressure fluid controlling device comprising a casing having a pair of valve chambers and supply, inlet and discharge passages opening into said chambers for the flow of pressure fluid, a valve in one of the said chambers having a portion in the supply passage to control the flow of pressure fluid from the supply passage to the inlet passage, a portion of the same valve in the discharge passage for controlling the flow of pressure fluid from the inlet passage to the discharge passage, a second valve in the other chamber normally positioned to permit such control by the first said valve and having a portion in the supply passage for controlling the flow of pressure fluid from the supply passage to the inlet passage, said second valve having a portion in the inlet passage for the control of fluid from the inlet passage to the discharge passage and also having a portion in the discharge passage for the control of fluid from the inlet passage to the discharge passage, the first said valve being operable to communicate the inlet and discharge passages independently of the position of the second valve, the second said valve being operable to communicate the inlet and discharge passages independently of the position of the first valve.

References Cited in the file of this patent

UNITED STATES PATENTS

| | | |
|---|---|---|
| 439,608 | Stayman | Oct. 28, 1890 |
| 912,385 | Kimball | Feb. 16, 1909 |
| 993,072 | Jones | May 23, 1911 |
| 1,301,290 | Mead | Apr. 22, 1919 |
| 1,914,028 | Knutzen | June 13, 1933 |
| 2,505,710 | Hayden | Apr. 25, 1950 |
| 2,613,650 | Mott | Oct. 14, 1952 |
| 2,620,824 | Slomer | Dec. 9, 1952 |